US012530743B2

(12) United States Patent
Herman et al.

(10) Patent No.: US 12,530,743 B2
(45) Date of Patent: Jan. 20, 2026

(54) IMAGE DATA ALIGNMENT FOR MOBILE SYSTEM SENSORS

(71) Applicant: Ford Global Technologies, LLC, Dearborn, MI (US)

(72) Inventors: David Michael Herman, West Bloomfield, MI (US); Larry Dean Sanders, Monroe, MI (US); Akshay Vaidya, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 18/500,278

(22) Filed: Nov. 2, 2023

(65) Prior Publication Data

US 2025/0148569 A1    May 8, 2025

(51) Int. Cl.
*G06T 5/50*       (2006.01)
*B60W 10/04*   (2006.01)
(Continued)

(52) U.S. Cl.
CPC .............. *G06T 5/50* (2013.01); *B60W 10/04* (2013.01); *B60W 10/20* (2013.01);
(Continued)

(58) Field of Classification Search
CPC .... G06T 5/50; G06T 7/70; G06T 7/90; G06T 2207/10024; G06T 2207/10152;
(Continued)

(56) References Cited

U.S. PATENT DOCUMENTS 10,242,287 B2    3/2019    Shiiyama et al.
10,579,865 B2    3/2020    Dal Mutto et al.
(Continued)

FOREIGN PATENT DOCUMENTS

EP    2749199 A2    7/2014
EP    3732662 A1    11/2020
(Continued)

OTHER PUBLICATIONS

Automotive Case Study, "Algolux Eos Embedded Perception vs. State-of-the-Art Models", Algolux Copyright, Jul. 2020.
(Continued)

*Primary Examiner* — Ali Bayat
(74) *Attorney, Agent, or Firm* — Frank Lollo; Brooks Kushman P.C.

(57) ABSTRACT

A computer that includes a processor and a memory, the memory including instructions executable by the processor to determine a first prediction with a machine learning system based on receiving a first image from a first camera and determine a second prediction with a machine learning system based on receiving a second image from a second camera. When the first prediction does not equal the second prediction within a user determined tolerance, determine color consistency based on comparing pixel values from the first image with a threshold determined based on previously determined pixel values, determine color correction parameters by determining pixel statistics based on pixel values from the first image to include in an image signal processing system and apply the color correction parameters to a third image from the first camera by receiving the third image at the image signal processing system.

20 Claims, 8 Drawing Sheets

(51) Int. Cl.
  *B60W 10/20*   (2006.01)
  *B60W 50/00*   (2006.01)
  *G06T 7/70*    (2017.01)
  *G06T 7/90*    (2017.01)
  *G06V 20/58*   (2022.01)
  *H04N 23/84*   (2023.01)
  *B60W 60/00*   (2020.01)

(52) U.S. Cl.
  CPC ........... *B60W 50/0097* (2013.01); *G06T 7/70* (2017.01); *G06T 7/90* (2017.01); *G06V 20/58* (2022.01); *H04N 23/84* (2023.01); *B60W 60/001* (2020.02); *B60W 2420/403* (2013.01); *G06T 2207/10024* (2013.01); *G06T 2207/10152* (2013.01); *G06T 2207/20081* (2013.01); *G06T 2207/20084* (2013.01); *G06T 2207/30256* (2013.01)

(58) Field of Classification Search
  CPC . G06T 2207/20081; G06T 2207/20084; G06T 2207/30256; B60W 10/04; B60W 10/20; B60W 50/0097; B60W 60/001; B60W 2420/403; G06V 20/58; G06V 10/56; G06V 10/82; H04N 23/84
  USPC ........................................................ 382/167
  See application file for complete search history.

(56) References Cited

U.S. PATENT DOCUMENTS

| | | | |
|---|---|---|---|
| 10,602,126 | B2 | 3/2020 | Rowell et al. |
| 2020/0043197 | A1* | 2/2020 | Bazin .................... G06N 3/084 |
| 2020/0273581 | A1* | 8/2020 | Wolf ...................... G16H 40/63 |
| 2021/0365750 | A1* | 11/2021 | Huberman ........... G06V 20/588 |
| 2022/0383019 | A1* | 12/2022 | Tremblay ............... G06V 40/11 |
| 2022/0398779 | A1 | 12/2022 | Lopez Alvarez et al. |
| 2023/0281847 | A1* | 9/2023 | Zhong ...................... G06T 7/70 382/104 |
| 2023/0298204 | A1* | 9/2023 | Wang ..................... G06T 19/20 345/419 |
| 2024/0257475 | A1* | 8/2024 | Xiong .................... G06T 7/593 |
| 2024/0412444 | A1* | 12/2024 | Philip ....................... G06T 7/70 |

FOREIGN PATENT DOCUMENTS

| | | |
|---|---|---|
| JP | 5214749 B2 | 6/2013 |
| JP | 6394338 B2 | 9/2018 |
| KR | 20200145670 A | 12/2020 |

OTHER PUBLICATIONS

Cruise, "Apr. 2023 Release Notes", copyright 2023 Cruise LLC.
Mosleh et al., "Hardware-in-the-loop End-to-end Optimization of Camera Image Processing Pipelines", This CVPR 2020 paper is the Open Access version, provided by the Computer Vision Foundation. Except for this watermark, it is identical to the accepted version; the final published version of the proceedings is available on IEEE Xplore.
Onzon et al., "Neural Auto-Exposure for High-Dynamic Range Object Detection", This CVPR 2021 paper is the Open Access version, provided by the Computer Vision Foundation. Except for this watermark, it is identical to the accepted version; the final published version of the proceedings is available on IEEE Xplore.
Yahiaoui et al., "Overview and Empirical Analysis of ISP Parameter Tuning for Visual Perception in Autonomous Driving", J. Imaging 2019, 5, 78; doi:10.3390/jimaging5100078, www.mdpi.com/journal/jimaging.

* cited by examiner

IMAGE DATA ALIGNMENT FOR MOBILE SYSTEM SENSORS

BACKGROUND

Computers can operate systems and devices including vehicles, robots, drones, and/or object tracking systems. Data including images can be acquired by sensors and processed by a computer to determine a location of a system with respect to an environment and with respect to objects in the environment. A computer may use the location data to determine one or more trajectories and/or actions for operating the system or components thereof in the environment.

DETAILED DESCRIPTION

Figure 1:
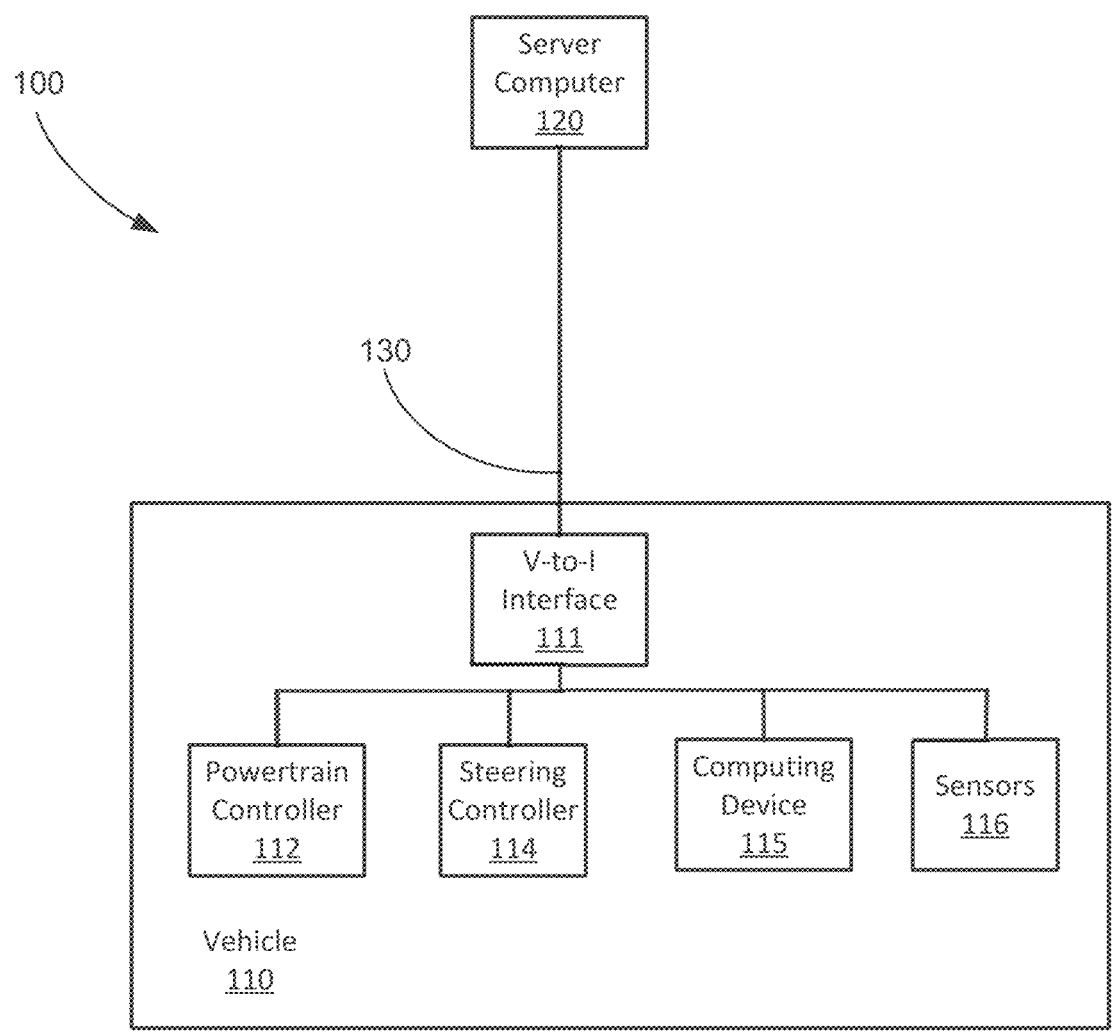
FIG. 1 is a block diagram of an example vehicle system.

Systems that move and/or that have mobile components, including vehicles, robots, drones, cell phones etc., can be operated by acquiring sensor data, including data regarding an environment around the system, and processing the sensor data to determine locations of objects in the environment around the system. The determined location data could be processed to determine operation of the system or portions of the system. For example, a robot could determine the location of another nearby robot's arm. The determined robot arm location could be used by the robot to determine a path upon which to move a gripper to grasp a workpiece without encountering the other robot's arm. In another example, a vehicle could determine a location of another vehicle traveling on a roadway. The vehicle could use the determined location of the other vehicle to determine a path upon which to operate while maintaining a predetermined distance from the other vehicle. Vehicle operation will be used herein as a non-limiting example of system location determination in description below.

A machine learning system, for example a convolutional neural network, can be trained to determine identities and locations of one or more objects included in the environment, for example roadways and vehicles. Convolutional neural networks include convolutional layers and fully connected layers and can be trained to identify and locate objects. Training a convolutional neural network can require a training dataset that can include thousands of video sequences that can include millions of images. In addition, training a machine learning system such as a convolutional neural network can require ground truth data for the images in the training dataset. Ground truth includes annotation data regarding the identities and locations of objects included in the training dataset acquired from a source other than the machine learning system, for example user annotation of the images in the training dataset.

A trained machine learning system such as a convolutional neural network can be installed in a computing device in a vehicle to receive sensor data from sensors included in the vehicle. The machine learning system can determine predictions regarding the received sensor data to assist in operating the vehicle. For example, a trained convolutional neural network can be trained to receive images from video cameras and determine predictions regarding an environment around a vehicle. Predictions can include determining the location and motion of the vehicle with respect to the environment and location and motion of objects in the environment. These predictions can include determining three-dimensional (3D) spatial-color coordinate systems based on acquired two-dimensional (2D) images.

Obtaining predictions that accurately identify and locate objects in an environment around a vehicle can depend upon acquiring images that match the appearance of images included in the training dataset that was used to train the machine learning system that determines the predictions. Matching appearance as used herein means having color consistency with images included in the training dataset. Color consistency as used herein means that different images include the same color values, e.g., the same RGB value, within a tolerance or margin (e.g., 10% or less), from a same physical location or object within a scene regardless of which of one or more cameras acquired the images. Color inconsistency means a lack of color consistency, e.g., when different images include different color values, greater than a tolerance value, in examples where color consistency is expected. Color consistency is typically expected when a camera views the same scene twice (camera consistency), when two cameras view the same object in portions of the same scene (spatial consistency) and/or when two cameras view the same object at different times (temporal consistency). Color inconsistency can be caused by changes in camara electronics over time, such as automatic gain control circuits, image signal processing (ISP) calculation, etc. and changes in camera optics, e.g., dirt on lenses, age-related changes in protective covers, etc. Color inconsistency can also be caused by differences in natural lighting, such as sun angle, or differences in artificial lighting such as headlights or streetlights. Differences in natural and artificial lighting between cameras can be caused by differences in fields of view for different cameras which result in different viewing angles for portions of a scene. Techniques described herein for correcting color inconsistency can also be applied to images acquired by grayscale cameras, multi-spectral cameras, cameras with sensitivity in the near infrared (NIR), infrared (IR), or ultraviolet (UV) portions of the electromagnetic spectrum and well as lidar. These techniques can also be used to correct color issues such incorrect assumptions regarding illumination invariant imaging or ISP color correction errors.

Systems such as vehicles can have multiple cameras that acquire data regarding the environment around the system, e.g., around a vehicle. The multiple cameras can acquire images that are input to a machine learning system to determine a location for a vehicle with respect to the environment, determine motion for the vehicle, and determine locations of objects in an environment around a vehicle such as other vehicles. Techniques described herein for color alignment can use differences in predictions determined based on multiple images by a machine learning system to determine color inconsistency. When color inconsistency is determined, statistical analysis can be performed on pixel data included in a color image to determine color consistency parameters included in an image signal processing system to enhance color consistency and mitigate differences in predictions determined by a machine learning system.

Color consistency can include component values for camera color consistency, spatial color consistency and temporal color consistency. Images that have camera color consistency have RGB pixels included in objects such as vehicles and roadways that have the same values within tolerances as described above when output by a camera when viewing the same type of scene illuminated by the same type of lighting. The same type of scene means that the same, or same types or classes of, objects such as roadways, street signs, and vehicles, etc., are included in the scene within a specified margin, e.g., 10%, of the same location, size, and orientation. The same type of lighting means the scene includes the same illumination, for example direct sun, overcast sun, streetlights, vehicle headlights, etc., within a specified margin, e.g., 10%, of the same sun angle, lighting intensity, illumination pattern, etc. Camera color consistency can be determined by acquiring images of the same type of scene illuminated by the same type of lighting at different times and comparing the predictions output by a machine learning system to determine whether the same predictions are output for images acquired at different times by the same camera.

Techniques described herein for color consistency can be used to filter out or calibrate objects with strong color or reflectivity anisotropy. For example, a road way surface (dry) would have a larger diffuse reflectivity component than a vehicle. Light sources in the scenes (e.g., sun position) can be calculated and object surface orientation compared to camera position angle to perform a bidirectional reflectance distribution function (BRDF) calculation of diffuse and specular reflectivity components. Some objects such as some painted cars may include paint with high color anisotropy. Determining outliers that exhibit strong color or reflectivity anisotropy can enhance detections and reduce false positives. As discussed above, camera color consistency can degrade over time due to drift in electronics or degradation in optics. Camera color inconsistency is caused by changes within a single camera.

Spatial color consistency means outputting images that include digital color values that match as described above by two different cameras when viewing portions of the same scene from different directions. Spatial color consistency can be determined by comparing predictions output by a machine learning system for overlapping portions of images acquired at substantially similar times by more than one camera. A machine learning system should determine the same predictions regarding objects included in overlapping portions of images acquired at substantially simultaneous times, e.g., within less than one second. A stereo or multi-view camera, when seeing the same object should predict the same color.

Temporal color consistency means outputting images that include color values that match as described above when viewing a scene at two different times by two different cameras. Temporal color consistency can be determined by comparing predictions output by a machine learning system for images acquired at different times by different times by different cameras. Temporal color consistency can be determined by using predictions output be a machine learning system to determine a trajectory for an object that includes speed and direction in real world coordinates. A computing device included in a vehicle can use the object trajectory and data regarding the fields of view of cameras included in the vehicle to estimate when an object will exit the field of view of a first camera and enter the field of view of a second camera.

Determining when an object will exit the field of view of a first camera and enter the field of view of a second camera can include determining a 3D projection of each camera as pixels may have varying disparities based on distance. In examples, a far distance object would have zero or low disparity for aligned cameras or at least fixed disparity for multi view stereo. In other examples a first pixel region in a first camera may be determined to correlate with a second pixel region in a second camera by determining corrections for differences in view angle and camera orientation. Targets can be chosen to reduce these factors below levels that would require corrections and thus affect predictions.

A machine learning system can process images acquired by the second camera at the estimated time to determine whether or not the machine learning system will correctly predict the identity and location of the object in the second image. Correctly predicting the object in images acquired by the second camera at the estimated time can indicate temporal color consistency between the first camera and the second camera. For example, a vehicle traveling at night can acquire color images that include light emitting diode (LED) flicker effects. Acquiring color images at an appropriate estimated time can reduce color LED flicker effects.

Statistical analysis can include determining a mean and standard deviation for pixel values in an image or portions of an image. The statistical analysis can be used to determine color consistency parameters for an image signal processing (ISP) system that can compensate for differences in image appearance. An ISP system can include hardware and software programs that can execute on a computing device included in a vehicle that inputs an image and transforms the image using several different transformations that can enhance color consistency as described below in relation to FIG. 3. Color consistency parameters herein mean values that determine transformations performed on the images that can enhance color consistency by changing RGB pixel values in a received color image.

By compensating for differences in image appearance color consistency, techniques described herein can reduce differences in machine learning system predictions between images from the same or different cameras. Techniques disclosed herein can compare predictions determined by a machine learning system based on receiving first and second different images of a scene acquired by first and second cameras respectively, or first and second images acquired at first and second times by a single camera. When the predictions differ, color data from the first image can be compared to color data from the second image. When the color data from the first image differs from the color data from the second image by more than an empirically determined threshold, the color data from the first image can be statistically analyzed to determine updated color consistency parameters that can be included in an image signal processing (ISP) system that processes images from the first camera. Updating the color consistency parameters in this fashion can cause the color data from images acquired by the first camera to be more color consistent with the color data from the training dataset and the color data from the second camera. Making the image data from the first camera more color consistent with the second camera can make the predictions determined by a machine learning system based on images from the first camera more consistent with the predictions determined by a machine learning system based on the second camera.

Disclosed herein is a method including determining a first prediction with a machine learning system based on receiving a first image from a first camera and determining a second prediction with the machine learning system based on receiving a second image from a second camera. When the first prediction does not equal the second prediction within a user determined tolerance: determine color consistency based on comparing pixel values from the first image with a threshold determined based on previously determined pixel values, determine color consistency parameters by determining pixel statistics based on pixel values from the first image to include in an image signal processing system, and apply the color consistency parameters to a third image from the first camera by receiving the third image at the image signal processing system. The threshold can be determined by varying pixel values in a training dataset image input to a machine learning system to determine when a prediction output changes based on the pixel values. The pixel statistics can include a pixel mean and a pixel standard deviation. The color consistency parameters can include one or more of lens shading, white balance, defect pixel, denoise, color interpolation, edge enhancement, color correction matrix, brightness/contrast, and gamma.

The color consistency can be based on determining one or more of camera color consistency, spatial color consistency, and temporal color consistency on the images. Camera color consistency can be determined by comparing images acquired by different cameras viewing the same scene with the same illumination. Spatial color consistency can be determined by comparing overlapping images acquired by different cameras viewing portions of the same scene with differing illumination. Temporal color consistency can be determined by comparing images acquired by the camera viewing the same scene at different times. The one or more first predictions and the second prediction can include one or more of object identity and object location. The object identity can include one or more of a roadway, or a vehicle. The machine learning system can include a convolutional neural network that includes convolutional layers and fully connected layers. A red, green, blue (RGB) color space image can be converted to a luma, red projection, blue projection (YUV) image and output. The machine learning system can be included in a mobile machine. The mobile machine can be operated based on one or more predictions.

Further disclosed is a computer readable medium, storing program instructions for executing some or all of the above method steps. Further disclosed is a computer programmed for executing some or all of the above method steps, including a computer apparatus, programmed to determine a first prediction with a machine learning system based on receiving a first image from a first camera and determine a second prediction with the machine learning system based on receiving a second image from a second camera. When the first prediction does not equal the second prediction within a user determined tolerance: determine color consistency based on comparing pixel values from the first image with a threshold determined based on previously determined pixel values, determine color consistency parameters by determining pixel statistics based on pixel values from the first image to include in an image signal processing system, and apply the color consistency parameters to a third image from the first camera by receiving the third image at the image signal processing system. The threshold can be determined by varying pixel values in a training dataset image input to a machine learning system to determine when a prediction output changes based on the pixel values. The pixel statistics can include a pixel mean and a pixel standard deviation. The color consistency parameters can include one or more of lens shading, white balance, defect pixel, denoise, color interpolation, edge enhancement, color correction matrix, brightness/contrast, and gamma.

The instructions can include further instructions wherein the color consistency can be based on determining one or more of camera color consistency, spatial color consistency, and temporal color consistency on the images. Camera color consistency can be determined by comparing images acquired by different cameras viewing the same scene with the same illumination. Spatial color consistency can be determined by comparing overlapping images acquired by different cameras viewing portions of the same scene with differing illumination. Temporal color consistency can be determined by comparing images acquired by the camera viewing the same scene at different times. The one or more first predictions and the second prediction can include one or more of object identity and object location. The object identity can include one or more of a roadway, or a vehicle. The machine learning system can include a convolutional neural network that includes convolutional layers and fully connected layers. A red, green, blue (RGB) color space image can be converted to a luma, red projection, blue projection (YUV) image and output. The machine learning system can be included in a mobile machine. The mobile machine can be operated based on one or more predictions.

FIG. 1 is a diagram of a vehicle computing system 100. Vehicle computing system 100 includes a vehicle 110, a computing device 115 included in the vehicle 110, and a server computer 120 remote from the vehicle 110. One or more vehicle 110 computing devices 115 can receive data regarding the operation of the vehicle 110 from sensors 116. The computing device 115 may operate vehicle 110 based on data received from the sensors 116 and data received from the remote server computer 120. The server computer 120 can communicate with the vehicle 110 via a network 130.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle propulsion (i.e., control of speed and/or changes in speed in the vehicle 110 by controlling one or more of an internal combustion engine, electric motor, hybrid engine, etc.), steering, climate control, interior and exterior lights, etc., as well as to determine whether and when the computing device 115, as opposed to a human operator, is to control such operations. The computing device 115 can also control the temporal alignment of lighting to sensor acquisition to account for the color effects of vehicle lights or external lights.

The computing device 115 may include or be communicatively coupled to, i.e., via a vehicle communications bus as described further below, more than one computing devices, i.e., controllers or the like included in the vehicle 110 for monitoring and controlling various vehicle components, i.e., a propulsion controller 112, a steering controller 114, etc. The computing device 115 is generally arranged for communications on a vehicle communication network, i.e., including a bus in the vehicle 110 such as a controller area network (CAN) or the like; the vehicle 110 network can additionally or alternatively include wired or wireless communication mechanisms such as are known, i.e., Ethernet or other communication protocols.

Via the vehicle network, the computing device 115 may transmit messages to various devices in vehicle 110 and receive messages from the various devices, i.e., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V2I) interface 111 with a remote server computer 120, i.e., a cloud server, via a network 130, which, as described below, includes hardware, firmware, and software that permits computing device 115 to communicate with a remote server computer 120 via a network 130 such as wireless Internet (WI-FI®) or cellular networks. V2X interface 111 may accordingly include processors, memory, transceivers, etc., configured to utilize various wired and wireless networking technologies, i.e., cellular, BLUETOOTH®, Bluetooth Low Energy (BLE), Ultra-Wideband (UWB), Peer-to-Peer communication, UWB based Radar, IEEE 802.11, and other wired and wireless packet networks or technologies. Computing device 115 may be configured for communicating with other vehicles 110 through V2X (vehicle-to-everything) interface 111 using vehicle-to-vehicle (V-to-V) networks, i.e., according to including cellular communications (C-V2X) wireless communications cellular, Dedicated Short Range Communications (DSRC) and the like, i.e., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V2I) interface 111 to a server computer 120 or user mobile device 160.

As already mentioned, generally included in instructions stored in the memory and executable by the processor of the computing device 115 is programming for operating one or more vehicle 110 components, i.e., steering, propulsion, etc., without intervention of a human operator. Using data received in the computing device 115, i.e., the sensor data from the sensors 116, the server computer 120, etc., the computing device 115 may make various determinations and control various vehicle 110 components and operations. For example, the computing device 115 may include programming to or control vehicle 110 operational behaviors (i.e., physical manifestations of vehicle 110 operation) such as speed, changing speed, steering, etc., as well as tactical behaviors (i.e., control of operational behaviors typically in a manner intended to achieve efficient traversal of a route) such as a distance between vehicles and amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and control a specific vehicle subsystem. Examples include a propulsion controller 112 and a steering controller 114. A controller may be an electronic control unit (ECU) such as is known, possibly including additional programming as described herein. The controllers may communicatively be connected to and receive instructions from the computing device 115 to actuate the subsystem according to the instructions.

The one or more controllers 112, 113, 114 for the vehicle 110 may include known electronic control units (ECUs) or the like including, as non-limiting examples, one or more propulsion controllers 112 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices such as are known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and other sensors 116 and the geographical coordinates provided by the GPS sensor may be used by the computing device 115 to operate the vehicle 110 autonomously or semi-autonomously, for example.

The vehicle 110 is generally a land-based vehicle 110 capable of autonomous and semi-autonomous operation and having three or more wheels, i.e., a passenger car, light truck, etc. Vehicle 110 includes one or more sensors 116, the V2I interface 111, the computing device 115 and one or more controllers 112, 113, 114. Sensors 116 may collect data related to the vehicle 110 and the environment in which the vehicle 110 is operating. By way of example, and not limitation, sensors 116 may include, i.e., altimeters, cameras, LIDAR, radar, ultrasonic sensors, infrared sensors, pressure sensors, accelerometers, gyroscopes, temperature sensors, hall sensors, optical sensors, voltage sensors, current sensors, mechanical sensors such as switches, etc. The sensors 116 may be used to sense the environment in which the vehicle 110 is operating, i.e., sensors 116 can detect phenomena such as weather conditions (precipitation, external ambient temperature, etc.), the grade of a road, the location of a road (i.e., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, oil pressure, the power level applied to controllers 112, 113, 114 in the vehicle 110, connectivity between components, and accurate and timely performance of components of the vehicle 110.

Server computer 120 typically has features in common, e.g., a computer processor and memory and configuration for communication via a network 130, with the vehicle 110 V2I interface 111 and computing device 115, and therefore these features will not be described further to reduce redundancy. A server computer 120 can be used to develop and train software that can be transmitted to a computing device 115 in a vehicle 110.

Figure 2:
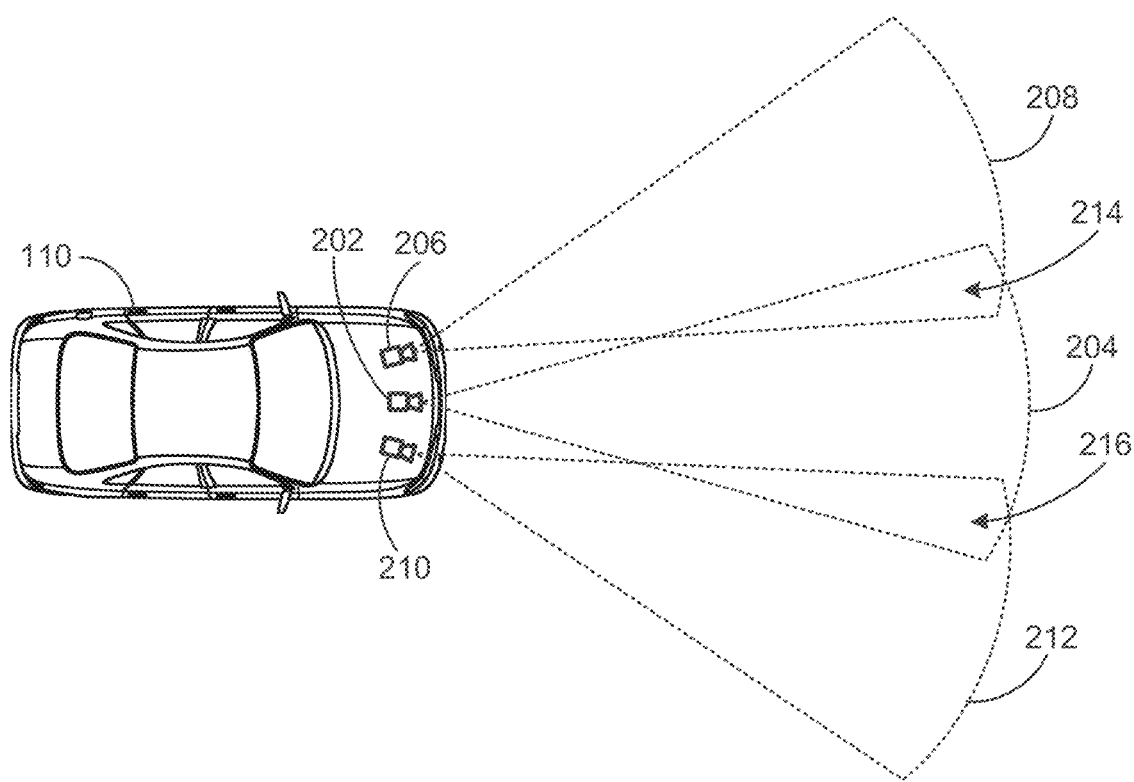
FIG. 2 is a diagram of an example vehicle including cameras.

FIG. 2 is a diagram of vehicle 110 including a center camera 202, a left camera 206, and a right camera 210. Center camera 202, left camera 206, and right camera 210 have fields of view 204, 208, 212, respectively. A camera field of view is a space within which the camera can obtain images. Fields of view 204, 208, 212 are the regions within which center camera 202, left camera 206, and right camera 210 can acquire color images of an environment around vehicle 110. Acquired color images can be received by a machine learning system included in a computing device 115 and processed to determine predictions regarding an environment around vehicle 110. A color image is defined as a multispectral image that samples the visible range of the electromagnetic spectrum. A color image can simulate a human response to panchromatic light or be tuned to enhance a particular portion of the spectrum, for example red light for low light detection. Predictions determined by a machine learning system can include predictions regarding an identity of an object such as a roadway or a vehicle included in the environment and a location of an object with respect to vehicle 110. By determining locations of objects with respect to a vehicle in successive images, motion of vehicle 110 with respect to the roadway and motion of an object with respect to vehicle 110 can be determined by computing device 115 based on predictions output by a machine learning system.

Fields of view 204, 208, 212 can include overlapping regions 214, 216 between center camera 202 and left camera 206, and center camera 202 and right camera 210, respectively. In examples the field of view 204, 208, 212 overlap can be determined by motion of the vehicle or the object. Objects included in overlapping regions 214, 216 can be included in two color images acquired during a time period. Techniques described herein for color consistency can use machine learning system predictions regarding an object occurring in two images to determine color consistency parameters to be included in an image signal processing (ISP) system that can enhance image color consistency and permit a machine learning system to determine similar predictions regarding objects in two color images. In this context, similar predictions means determining the same identity and locations within a user-determined tolerance.

Figure 3:
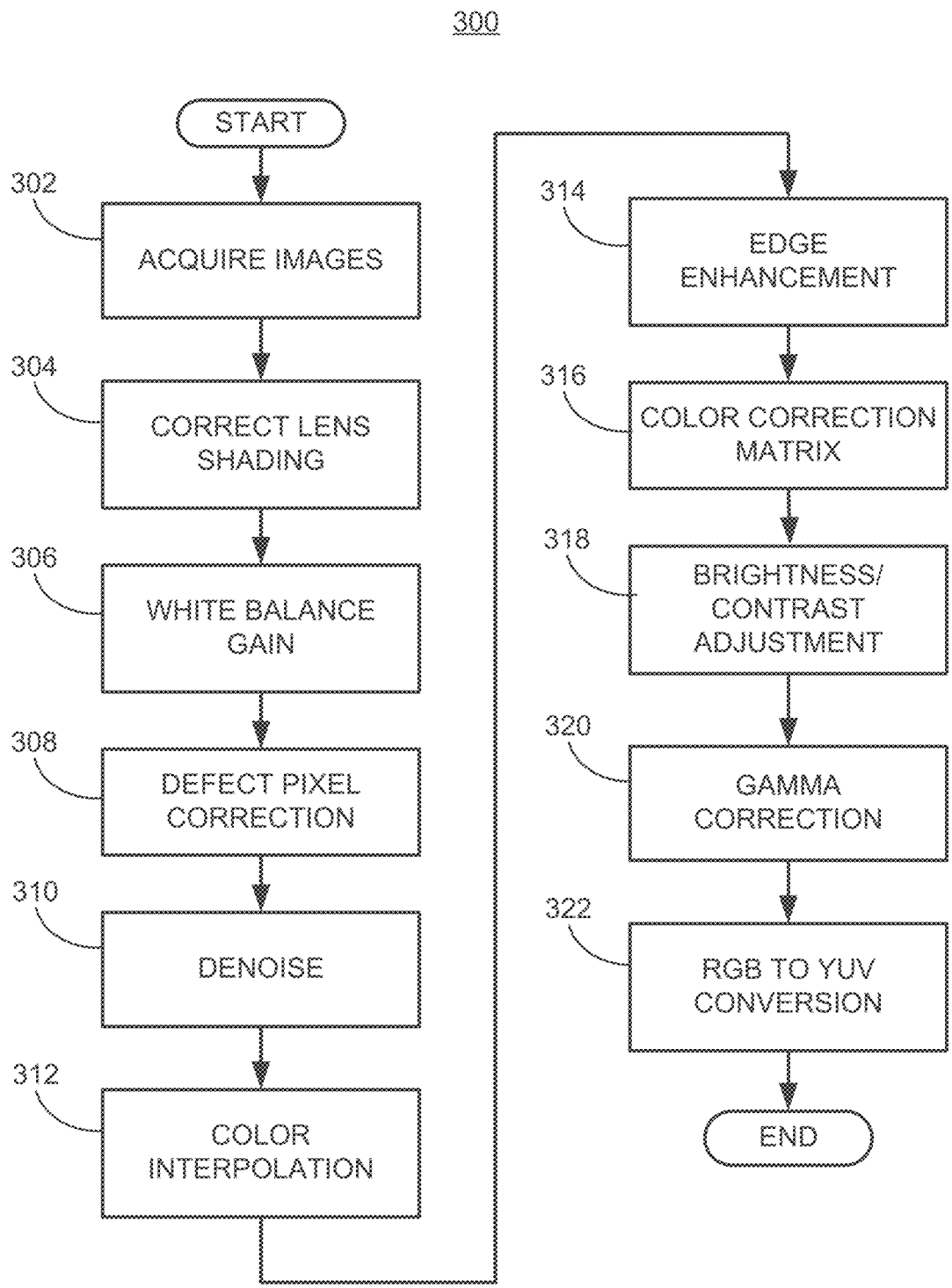
FIG. 3 is a diagram of example vehicle image data.

FIG. 3 is a flowchart of a process 300 for updating color consistency parameters in an image signal processing system 600 to enhance color consistency. Process 300 can be implemented by image signal processing hardware included in a vehicle 115 and image signal processing software executing on a computing device 115, for example.

FIG. 3 is a flowchart diagram of a process 300 for enhancing color consistency in color images. Process 300 can be implemented as an image signal processing (ISP) system including hardware and software executing on a computing device 115 to enhance color consistency by changing RGB pixel values in an image to approximate RGB pixel values in previously acquired images. Process 300 includes multiple blocks that can be executed in the illustrated order. Process 300 could alternatively or additionally include fewer blocks and can include the blocks executed in different orders.

Process 300 operates on RGB pixels included in an image acquired by a camera included in vehicle 110. A separate process 300 can receive image data from each camera included in a vehicle 110 and transform the RGB pixel values included in the image according to image transformations as described herein. The image transformations can be adjusted by color consistency parameters determined based on image statistics determined by comparing RGB pixel values in an acquired image with previously acquired images as described below and in relation to FIGS. 4-6 to enhance image consistency. Color consistency parameters include automatic gain control parameters, lens shading parameters, white balance gain parameters, defect pixel parameters, denoise parameters, color interpolation parameters, edge enhancement parameters, color correction matrix parameters, brightness/contrast correction parameters, and gamma correction parameters as discussed below.

Process 300 begins in a block 302, where an image is acquired by a sensor included in a camera included in vehicle 110, e.g., camera 202, 206, 210. Image sensors can include automatic gain control parameters that can be applied to the RGB pixels of the acquired image. Automatic gain control varies a multiplicative value applied to each pixel of an image sensor to expand or reduce the dynamic range of the pixel data. In examples where the maximum pixel value in the acquired image is less than the maximum allowable value, automatic gain control multiplies each pixel by a value greater than one that tries to bring the maximum pixel value closer to the maximum allowable value. In examples where the maximum pixel value exceeds the maximum allowable value, automatic gain control multiplies each pixel by a value less than one to bring the maximum pixel value closer to the maximum allowable value, The automatic gain control parameter determines how strongly the gain control adjusts pixel values. For example, an automatic gain control parameter of 1.0 brings the pixel values up or down to the maximum allowable level. In another example, an automatic gain control parameter of 0.5 brings the pixel values half-way from the initial value to the maximum allowable value and so forth.

At block 304 the acquired image is corrected for lens shading. Lens shading is a difference in image brightness that is a function of pixel location in the image and is caused by differences in light transmission by different portions of a lens. One form of image shading differences is known as "vignetting." Vignetting is a darkening of pixels included in the outer edges of an image, typically caused by lens design, focal length and/or aperture choice. In vignetting pixel values decrease as a function of distance from an image center. Other forms of lens shading can be caused by lens or sensor mis-alignment or partial blockage in front of the camera. Lens shading can be corrected by adding a correction image to the acquired image which increases the RGB pixel values in the dark portions of the image. A correction image includes a pattern of pixel values of the same X, Y dimensions at the input image that compensate for brightness deviations in the pixel values. Image shading differences can be determined by acquiring an image of an evenly illuminated solid color panel, which can be gray or white in color, and analyzing the resulting image. Deviations from an even pattern of light in an acquired image can be saved as lens shading parameters including a correction image. The lens shading parameters including the correction image can be stored in lens shading and added to an acquired image to correct for differences in image brightness by adding the stored correction image to acquired images.

At block 306, an acquired image is corrected for white balance. White balance assumes that an image of a solid white panel acquired by image sensor will generate RGB pixels, which, when re-combined in an image display device will result in pixels that are perceived as the color white by an observer. If the RGB pixels generated by a white panel acquired by image sensor 602 do not recombine to form white pixels, correction values can be applied separately to the R, G, and B channels separately for each pixel. The white balance correction factor can be determined that cause the RGB channels to combine to form pixels which appear white. These white balance correction values can be stored as white balance parameters and applied to each image acquired by an image sensor to correct white balance in an image by adding the stored R, G, and B values to the R, G, and B channels of an acquired image.

Next, at lock 308, defected pixels may be detected and repaired. A defective pixel is a pixel that includes RGB values that deviate from neighboring pixels by more than a user-selected amount, for example more than 50%. Defect pixels can be "stuck off", meaning they return a zero brightness value regardless of the input scene brightness, or "stuck on", meaning they return a maximum brightness value regardless of the input scene brightness value. Defect pixels can be evident in acquired images by appearing as isolated bright or dark pixels. Defect pixels can be determined by acquiring a uniformly dark image and a uniformly bright image and detecting pixels that deviate from the uniform brightness or darkness. Locations of detected defective pixels can be stored as defect pixel parameters and used to correct defective pixels by replacing the defective RGB pixel values with an average of the R, G or B pixel values from neighboring pixels.

Next, at block 310, electronic noise occurring in image data can be reduced. The process by which an image sensor captures photons of light and converts the photons of light into a digital RGB pixel can introduce variations in signal strength or electronic noise at several steps in the process. In some examples the image data can be de-mosaiced prior to processing. De-mosaicing refers to pre-processing image data acquired by a sensor that includes adjacent red, green, and blue filters to acquire RGB image data with a single sensor. Noise can appear in image data as random variations in RGB pixel values. This noise can be reduced by performing spatial and temporal filtering to smooth the image data, trading small amounts of spatial or temporal resolution for greater color fidelity. A filter can be a 2D neighborhood, such as a 3×3 or 5×5 group of pixels surrounding a pixel to be processed. The pixels in the neighborhood can be combined to determine a central tendency statistic that can be used to change the pixel to be processed. Typically, the neighborhood is moved over the image row by row, pixel by pixel to determine new values for each pixel in an image. Filter parameters include the size and shape of the neighborhood and the type of central tendency filter to determine. For example, central tendency filters can include mean, mode, and median values. A noise filter can replace a pixel value with a value based on the central tendency filter calculated based on the neighborhood pixels. A strength parameter determines how much of the difference between a pixel and its neighbors is applied to the pixel, for example. Noise filter parameters can be determined by measuring the variance in color pixel data over the image.

Next, at block 312 intermediate color values between adjacent RGB pixels can be interpolated. Because color images are often acquired using a color filter array placed in front of a CMOS image sensor, color images can include artifacts based on the color filter array. Color interpolation 312 can reduce the artifact by interpolating color pixels between RGB pixels in the original input image. Color interpolation parameters can be determined by measuring the variance in each color separately. Color interpolation can be performed in the X-direction, Y-direction or both.

The processing included in lens shading block 304, white balance block 306, defect pixel block 308, and denoise block 310 are based on a gray world assumption of color, which assumes that each of the RGB color channels averages to gray over an image. Deviations to the gray world assumption on either a macro level (whole or large image regions) or micro level (adjacent pixels or small regions) can result in changes to color consistency parameters in one or more of lens shading block 304, white balance block 306, defect pixel block 308, and denoise block 310 that will remedy the deviations from the gray world assumptions. Changes in color consistency parameters based on deviations from a gray world assumption can be corrected by automatic gain control as described above at block 302 can be returned to block 302 to be stored as automatic gain control parameters. Changes in color consistency parameters based on deviations from a gray world assumption that can corrected by white balance as described above in relation to block 306 can be returned to automated white balance gain block 306 to adjust white balance gain.

At block 314 an edge enhancement filter performs a spatial high pass filter to increase edge strength in the color image. A high pass filter is a 2D filter from a family of filters that includes simple X and Y directional derivatives, edge detectors such as Sobel, Prewitt, or Canny, or higher order filters such as Laplacian. Color consistency parameters applied to the edge enhancement filter can select the type of edge detector and can determine the amount of amplification applied to enhance edges in the color image. The amount of amplification can be determined by processing edge amplified images with a machine learning system to determine an amount of amplification that enhances object detection without generating false positive object detections.

At block 316, a color correction matrix can be applied to the acquired image. A color correction matrix includes parameters that can remap individual RGB color pixels in an image to correct for incorrect color mapping by an image sensor. Remapping can use look up tables, which can be implemented as arrays that use RGB pixel values as indices into three arrays, one each for red, green, and blue channels. The lookup tables output RGB pixel values that can transform the input RGB pixels into user selected RGB values. Color correction can compensate for changes in color appearance based on illumination. For example, artificial light can alter the appearance of colors in images depending upon the light source. Colors look different in artificial light depending upon the technology used to generate the light. By analyzing the pixel statistics, the type of lighting can be determined and a color correction matrix that compensates for that type of lighting can be selected.

At block 318 the RGB pixel values included in a color image can be corrected for overall brightness and contrast. A brightness parameter is a single digital value that can be added to the RGB pixels, and a contrast parameter is a single digital value between that can be multiplied times the RGB pixels to adjust the brightness and contrast of the color image. Brightness/contrast parameters can be determined based on RGB pixel statistics.

At block 320, the color image is passed to gamma correction, where the response of the camera is corrected. Response of an image sensor is the shape of the curve that transforms photon energy received by the sensor into electrons. Gamma is corrected by raising the input RGB pixel values to a user selected power (gamma) and multiplied by a user selected constant to approximate the visual response of the human eye. Modifying the input RGB pixels using gamma correction will permit a machine learning system to determine predictions regarding objects that approximate the performance of a human eye. Gamma correction parameters can be determined based on RGB pixel statistics determined based on separating dark (shadows) from light portions and determining statistics for each portion separately. Gamma correction parameters provide image detail in both dark and light portions of an image.

At block 322, the color image is converted from RGB pixel values to YUV pixel values. A linear function converts the red, green and blue channels from an RGB color space to a YUV image. YUV pixels include an intensity or luma channel (Y), a first chroma or red projection channel (U) and a second chroma or blue projection channel (V) that more closely approximate the human eye response, which is more sensitive to intensity than color for processing with a machine learning system. Following block 322 a color image output from the ISP system described by process 300 can be output to a machine learning system to determine predictions regarding objects included in the color image. Following block 322 process 300 ends.

Figure 4:
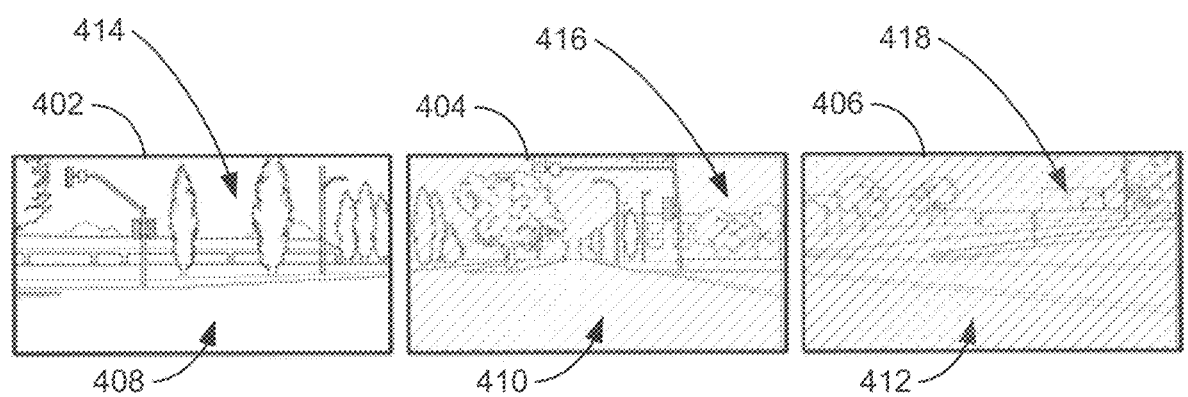
FIG. 4 is another diagram of example vehicle image data.

FIG. 4 is a diagram of three color images 402, 404, 406 from three cameras included in vehicle 110. Color images 402, 404, 406 include overlapping views of a traffic scene that includes roadways 408, 410, 412 and backgrounds 414, 416, 418 including buildings and foliage. Color images 402, 404, 406 can be acquired by cameras as three 8-bit channels of red, green, and blue (RGB) color data each arranged as a 2D array of RGB pixels that can be accessed by their X, Y address in the 2D array. Color spaces other than RGB can be used by techniques described herein without loss of generality, for example luma, blue-difference, red-difference (YCBCR), and hue, saturation, brightness (HSB) are color spaces that can be used to represent color pixels.

A machine learning system executing on computing device 115 in vehicle 110 can receive the color images 402, 404, 406 and process them to determine predictions regarding the traffic scene included in the color images 402, 404, 406. For example, a machine learning system can determine predictions regarding the locations of roadways 408, 410, 412 and determine the location of vehicle 110 with respect to roadways 408, 410, 412. A machine learning system can determine predictions regarding the locations of static objects included in color images 402, 404, 406 such as lane markers, traffic signals, and traffic signs. A machine learning system can also determine predictions regarding identities and locations of movable objects included in color images 402, 404, 406 such as vehicles.

Computing device 115 can use the predictions output from a machine learning system to determine a vehicle path upon which to operate vehicle 110. A vehicle path can be a polynomial function that includes locations, directions, and speeds for vehicle 110 as a function of time. The vehicle path can be analyzed by computing device 115 to yield operations to be applied to vehicle 110 by one or more of vehicle propulsion or vehicle steering that can cause vehicle 110 to travel along the vehicle path.

Computing device 115 can use predictions output by a machine learning system to determine a vehicle path that directs vehicle 110 to stay in a traffic lane as indicated by roadway edges and lane markers, follow direction indicated by traffic signals and traffic signs, and maintain user-determined limits on distances to be maintained with respect to moveable objects. Accuracy of predictions output by a machine learning system in response to receiving color images 402, 404, 406 can be affected by the consistency of the colors output from each camera. Accuracy of predictions as used herein means that a prediction correctly identifies an object in and image and correctly locates the object with respect to a vehicle in real world coordinates. Techniques described herein can enhance the accuracy of predictions output by machine learning systems by enhancing color consistency in images acquired by cameras included in a vehicle. Predictions determined based on images acquired by sensors included in a vehicle can be compared. When the predictions do not match, e.g., the identity and location of an object do not match, RGB pixel values included in the image that includes the unsuccessful prediction can be compared to RGB values for images that have been previously successfully processed by a machine learning system to determine differences between images that include successful predictions with images in which the machine learning system did not successfully predict objects. When the RGB pixels values in unsuccessfully predicted images differ from the RGB pixel values in the successfully predicted images by greater than a user determined threshold, statistical measures can be determined based on the RGB values that can be used to determine color consistency parameters that can be input to transformations included in an ISP system to enhance color consistency and enhance the accuracy of predictions determined based on color images.

Color images 402, 404, 406 illustrate differences in color consistency between three cameras included in a vehicle 110 viewing a traffic scene. RGB pixel values for portions of the color images 402, 404, 406 that are included in roadways 408, 410, 412 can differ between color images 402, 404, 406 even though the materials that comprise the roadways 408, 410, 412 are identical. In this example the difference in RGB color values in roadways 408, 410, 412 in color images 402, 404, 406 can be caused by color inconsistency. As defined above, color inconsistency means that the RGB color values in two images differ by more than a threshold, e.g., a user determined threshold. If the three color images 402, 404, 406 were acquired at different times, temporal color inconsistency could cause the RGB pixel values to differ.

In the example illustrated in FIG. 3, the color inconsistency between the roadways 408, 410, 412 in color images 402, 404, 406 can be caused by spatial color inconsistency. The color images 402, 404, 406 can be acquired by center camera 202, left camera 206 and right camera 210 included in a vehicle 110. The center, left, and right cameras 202, 206, 210 can be arranged to have three different fields of view 204, 208, 212 and point in three different directions with respect to vehicle 110 and the traffic scene. Because of the angle at which strong sunlight is reflected by roadways 408, 410, 412, the strong sunlight can be reflected by roadway 408 directly into the lens of left camera 206 of vehicle 110 to make the roadway 4408 in image 402 appear bright. Detecting strong direct sunlight can permit the system to reduce specular reflections and lens flares that could lead to errors. Because the field of view 204 of center camera 202 is different than left camera 206, the angle at which the strong sunlight is reflected off roadway 410 into the lens of center camera 202 is different than the angle at which the strong sunlight is reflected into the lens of the left camera 204, making the image of the roadway 410 in image 404 darker than the image of the roadway 408 in left camera 204 image 402. In turn, the angle of right camera 210 with respect to the direction in which strong sunlight is reflected from roadway 412 in image 406 is more oblique with respect to the direction of the strong sunlight and because of this the light reflected by roadway 4412 in image 406 is reflected from away from the lens of right camera 210 than center camera 202 to make the roadway 4412 in image 406 even darker than roadway 4410 in image 404. Differences in RGB color pixels in color images 402, 404, 406 due to spatial color inconsistency can cause a machine learning system that determines predictions that identify and locate roadways 408, 410, 412 in all three color images 402, 404, 406 to output different predictions regarding the roadways 408, 410, 412. Roadway predictions can include locations of roadway edges, locations of lane markers, and centers of lanes, etc. For example, a machine learning system can accurately predict the location of roadway 4408 in image 402, miss some location of roadway 4410 in image 404, and not predict the identity and location of roadway 4412 in image 406 at all.

A threshold color consistency value can be determined based on empirical testing performed using test images and the machine learning system. The threshold color consistency value can be determined by varying pixel values in a training dataset image input to a machine learning system to determine when a prediction output changes based on the pixel values. For example, color images that include an object that can be processed by a machine learning system to correctly predict an identity and location of an object. The image received by the machine learning system can be iteratively altered by changing RGB pixel values until the machine learning system unsuccessfully predicts the object. Other color spaces other than RGB can be used to determine a threshold. For example, an HSB color space can be used to determine the differences in hue, saturation, and brightness as they are altered to determine the effect on prediction accuracy.

Techniques for color consistency as described herein use expected predictions to correct RGB color values in color images. At training time, a machine learning system can be trained to make predictions regarding identity and locations of objects in an environment around vehicle 110. For example, a machine learning system can be trained to identify and locate roadways 408, 410, 412 including roadway edges, lane markers, traffic signals, and signage. RGB pixel data included in a portion of an image including an object that was processed by the machine learning system to determine a prediction that correctly identifies and locates an object can be examined to determine one or more colors included in the object. For example, a stop sign can include both red and white colors. The RGB pixel values included in the image representing the stop sign can be examined by performing a statistical analysis to group the colors in to groups that can be labeled "red" and "white." A maximum likelihood technique is one technique for grouping similar colors together, for example. The color groups can be further processed to yield statistics regarding the distribution of colors within a group. Assuming a Gaussian distribution, the color groups can be analyzed to determine a pixel mean and pixel standard deviation for each color group.

The RGB pixel values included a portion of an image that includes an object that can be identified and located by a machine learning system can be used to determine a nominal value for the RGB pixel values and a threshold. The threshold can be determined by incrementally changing the RGB values included in an object and processing the image that includes the object with the machine learning system. When the change in the RGB values is great enough to cause the machine learning system to stop identifying and locating the object, a threshold has been determined. In practice, when a machine learning system unsuccessfully identifies and locates an object, the RGB values included in the portion of the image that includes the object can be compared to the threshold determined for that object with that machine learning system. If the RGB values included the portion of the image that includes the object are less than the threshold value, the machine learning system can unsuccessfully predict that the image includes an object is because of the RGB values in the portion of the image that includes the object are different than the RGB values included in images in the training dataset that included similar objects.

When computing device 115 determines that the machine learning system has unsuccessfully identified and located an object by comparing predictions from a first image with predictions from an overlapping portion of an image that includes the same object, computing device 115 can determine that the machine learning system has unsuccessfully predicted an object. Computing device 115 can also determine that a machine learning system has unsuccessfully predicted an identity and location of an object based on determining object motion and estimating that a first image should include an object based on predicting object motion in a second image. Comparing predictions can also account for examples that occur rarely such as water droplets or dirt on a camera lens. Rarely occurring or temporary examples such as these can affect camera to camera prediction correlations. Comparing predictions for each camera while vehicle 110 is moving can indicate regions of the image that are not reliable due to rarely occurring or temporary issues such as water droplets or dirt.

When the computing device 115 determines that the machine learning system has unsuccessfully identified and located and object and the RGB values included in the portion of the image that includes object are less than the previously determined threshold, the RGB values can be statistically analyzed. Statistical analysis can include determining a mean and standard deviation for the RGB values in an image and comparing them to previously determined nominal mean and standard deviation values to determine a change in color consistency parameters included in an ISP system. The change in color consistency parameters included in an ISP system can transform the RGB values acquired by a camera into RGB values that will more likely be successfully processed by a machine learning system to predict an identity and location of an object. Techniques described herein for color consistency processing could be used in conjunction with other image processing techniques. e.g., illumination invariant imaging where color consistency processing could be used as a preprocessing step.

In examples of color consistency techniques as discussed herein, statistical analysis of RGB images greater than a threshold can be used to trigger changes in color consistency parameters without determining differences in predictions output by a machine learning system. In examples of color consistency techniques that rely on statistical analysis of RGB image without requiring differences in predictions to trigger changes in color consistency parameters, the statistical analysis of RGB images would be performed on all input images or periodically on a subset of input images and tested to determine if a difference between image exceeded a user-determined threshold.

Figure 5:
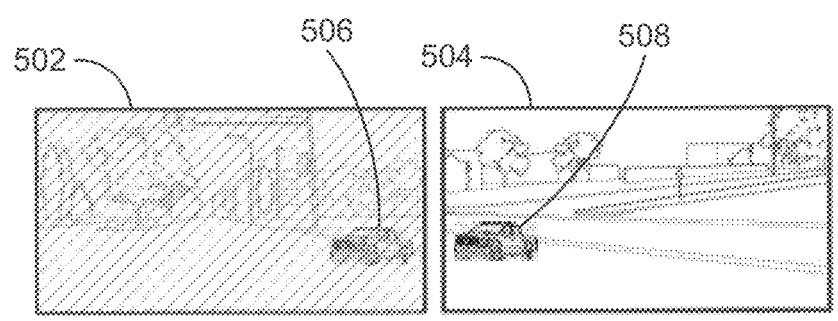
FIG. 5 is a further diagram of example vehicle image data. diagram of an example image signal processing system.

FIG. 5 is a diagram of two color images 502, 504 acquired by two cameras included in a vehicle 110 that illustrates spatial color consistency techniques. Due to differences in type of illumination and type of scene as defined above, RGB values of colors in color images 502, 504 can have different appearances. For example, differences in illumination can be caused by differences in sunlight angles or shadows, differences in artificial illumination such as headlights or streetlights. Differences in types and locations of objects can also cause differences in RGB pixel values. Differences in image colors can also be caused by differences in ISP color consistency parameters. Color images 502, 504 include overlapping portions, e.g., the right hand portion of color image 502 overlaps the left hand portion of color image 504. Because the image of vehicle 506 is included in an overlapped portion of image 502, another image of the vehicle 50812 occurs in image 504. Because of differences in illumination between color images 502, 504, RGB pixels included in the portion of image 502 that includes vehicle 506 can have different values than RGB pixels included in the portion of image 504 that includes vehicle 508.

Differences in RGB pixel values between images of vehicle 506 and vehicle 508 can cause a machine learning system to successfully predict an identity and location of vehicle 508 and unsuccessfully predict an identity and location of vehicle 506. When a machine learning system outputs a prediction that includes an overlapped portion of a first color image, a color consistency system can check the predictions output by the machine learning system for the overlapped portion of an adjacent color image to ensure that the same prediction was output. If the prediction in the adjacent color image is different or missing, a color consistency system can compare the RGB pixel values in the adjacent image with a user determined threshold value. If one or more RGB pixels in the adjacent image are less than the threshold, a statistical analysis of the RGB pixels of the adjacent color image can be performed to determine changes to color consistency parameters included in an image signal processing (ISP) system included in a computing device 115. The changes to color consistency parameters can adjust the RGB values in the adjacent color image to permit the machine learning system to correctly output prediction for image 402 that match the predictions included in the color image 504. An ISP process that implements color consistency is described in relation to FIG. 3, above.

Figure 6:
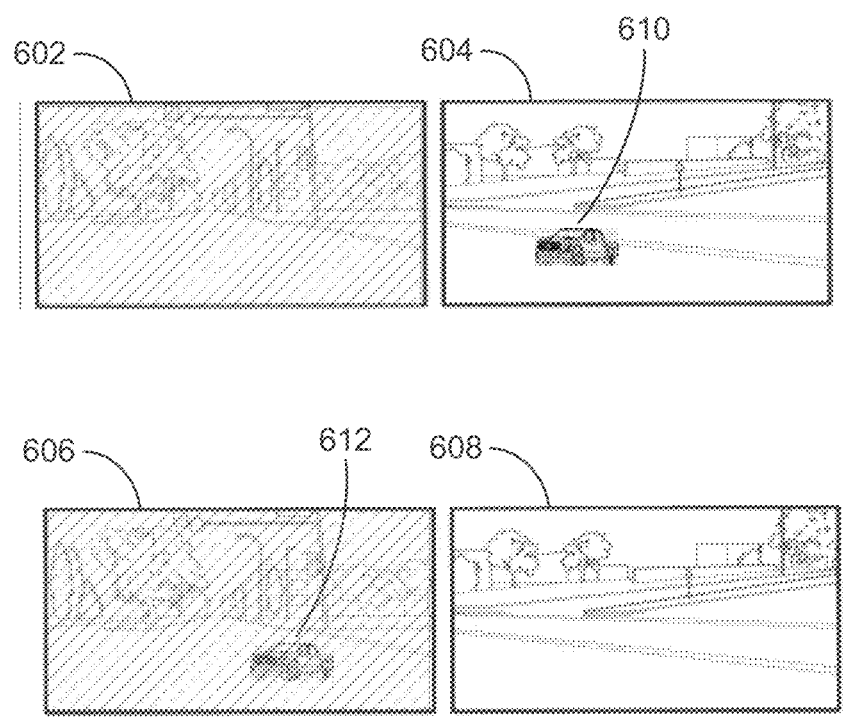
FIG. 6 is a diagram of an example image signal processing system.

FIG. 6 is a diagram of four color images 602, 604, 606, 608 that illustrate differences in temporal color consistency. Pairs of color images 602, 604 acquired by two cameras included in a vehicle 110 and at a later time two more color images 606, 608 are acquired by the same two cameras. Because of differences in illumination between color image 602 and color image 606, an image of vehicle 610 can have different RGB pixel values than an image of vehicle 612 acquired at a later time. Because of the difference in RGB pixel values, a machine learning system can predict an identity and location of vehicle 610 and unsuccessfully predict an identity and location of vehicle 612.

Temporal color consistency techniques can detect locations of vehicle 610 in image 604 and, based on multiple predictions, determine a trajectory for vehicle 610. Based on the relationship between fields of view of the cameras that acquire images 602, 604, 606, 608, and a determined trajectory for vehicle 610, a computing device 115 in vehicle 110 can predict that a vehicle 610 in color image 604 will appear in color image 606 at a later time. If a machine learning system does not correctly predict an identity and location for a vehicle 612 when a trajectory of an object determined based on color image 604 would cause it to be expected to appear in color image 606 at an estimate time and location based on the fields of view of the cameras that acquired color images 604 and 606, respectively, RGB pixel values in the region predicted to include the vehicle 612 can be compared to a threshold as discussed above in relation to FIG. 3.

When RGB pixel values from an image region that is expected to produce a prediction regarding an object are less than a previously determined threshold, the RGB values can be statistically analyzed by determining a mean and standard deviation, for example, to determine changes to color consistency parameters included in an ISP. The changes to color consistency parameters in an ISP that processes color images acquired by cameras included in a vehicle 110 can permit a machine learning system to correctly predict identities and locations of objects such as vehicle 612 included in a color image 606.

Figure 7:
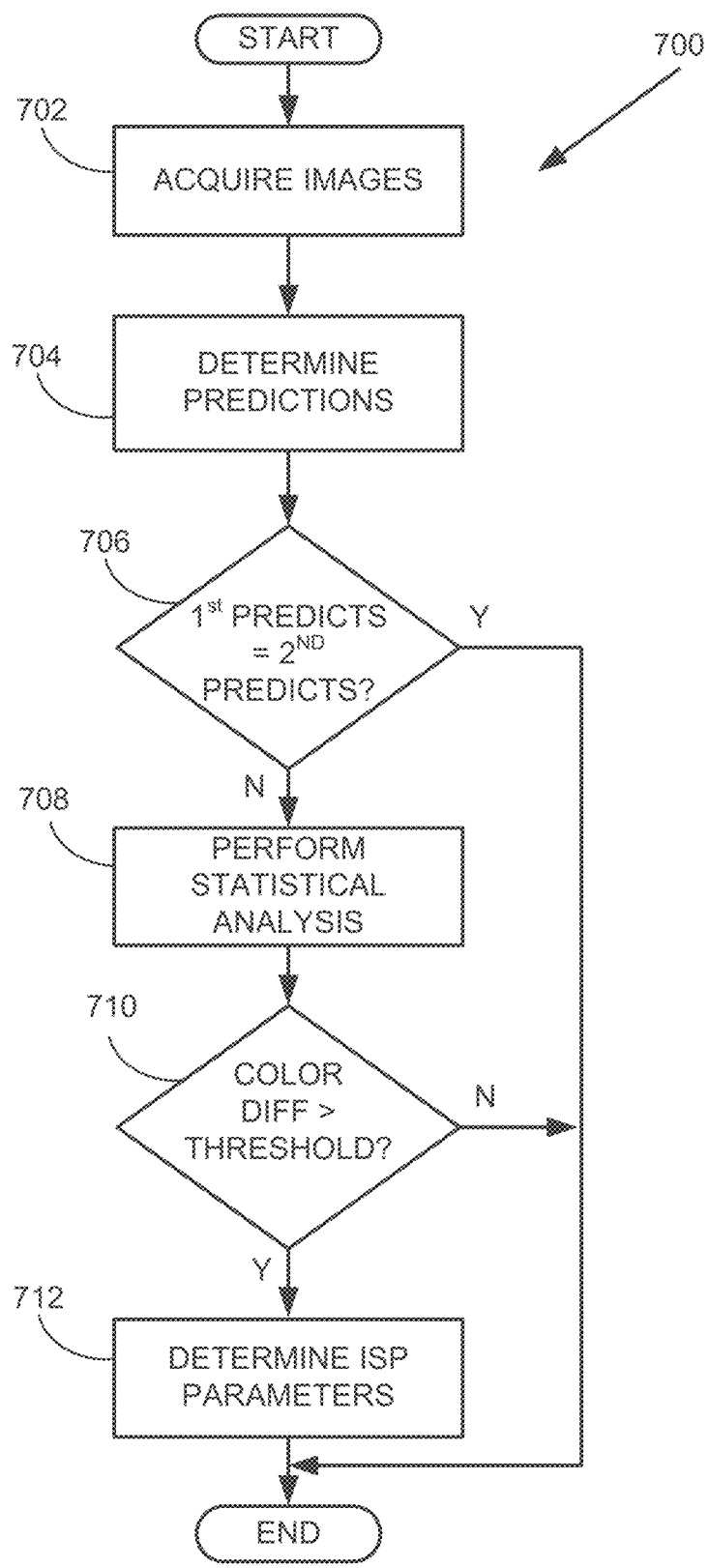
FIG. 7 flowchart diagram of an example process to generate camera, spatial and temporal correction data.

FIG. 7 is a flowchart of a process 700 for updating color consistency parameters in an image signal processing system 700 to enhance color consistency. Process 700 can be implemented in a computing device 115, for example. Process 700 includes multiple blocks that can be executed in the illustrated order. Process 700 could alternatively or additionally include fewer blocks, and can include the blocks executed in different orders.

Process 700 begins at block 702, where a computing device 115 acquires two or more color images from one or more cameras included in vehicle 110. The color images can be color images of a scene that include the same object acquired by different cameras to determine camera consistency, color images of a scene that includes overlapping portions that include the same object to determine spatial color consistency, or color images that include an object at two locations in a scene acquired at two different times to determine temporal color consistency. Examples of situations that can affect color consistency include LED flicker or quickly changing shadows caused by vehicle 110 motion.

At block 704 the color images acquired at block 702 are received by a machine learning system to determine a prediction regarding object identity and location included in the color images. As described above, predictions output from a machine learning system can identify object classes and object locations included in an image. For example, a machine learning system can input an image and output predictions that include an identity equal to "roadway" and location data that specifies the edges of the roadway and centers of lanes visible in the image. Another machine learning system can output predictions that include an identity equal to "vehicle" and location data that describes a location for the vehicle with respect to the roadway. Predictions typically include object identity and location but can include other properties of objects such as size and motion. Objects to be predicted include roadways and vehicles, etc. The machine learning system can be a trained neural network that can be a convolutional neural network. A convolutional neural network can receive a color image and output a prediction regarding an identity and a position of an object in the color image. Objects included in the color images can include vehicles, for example.

At block 706 computing device 115 can compare predictions regarding an object that occurs in two color images. When the two color images are acquired by two cameras observing the same field of view from the same direction so that the illumination of the scene and the object is the same, any difference between predictions output by a machine learning system can be determined to be caused by differences in camera color consistency. When the two color images are acquired by two cameras viewing overlapping portions of a scene viewed with different fields of view, differences in predictions can be determined to be caused by differences in color consistency due to illumination differences included in the two color images. When the two color images are acquired by two cameras viewing the same object at two different times, difference in predictions can be caused by differences in temporal color consistency. When first predictions from a first color image are the same as second predictions from a second color image, process 700 the color images include color consistency and process 700 ends. When first predictions from a first color image are different than second predictions from a second color image, process 700 passes to block 708.

At block 708 color image statistics based on RGB pixel values are calculated by computing device 115 for the first and second color images. The color image statistics can include mean and standard deviation of RGB pixel values in the respective images, color sensitivity, which is the number of distinguishable distinct colors, sensitivity measurement index (SMI), which is the ability to reproduce accurate colors, white balance, color matrix and full color sensitivity as discussed above, for example. The statistics can be determined for the first and second color images or for portions of the first and second color images, for example portions of the first and second color images that include an object, for example.

At block 710 the image statistics from first color images and second color images are compared. When a difference between the image statistics from the first color image and the statistics from the second color image is less than a user determined threshold, process 700 ends. When a difference between the image statistics from the first color image and the statistics from the second color image is greater than a user determined threshold, process 700 passes to block 712.

At block 712 the image statistics calculated for the second color image are used to determine parameter updates for an ISP system that processes color images for the second camera. For example, if the mean pixel value for the second color image is less than the mean pixel value of the first color image, color consistency parameters can be updated to brightness/contrast 522 of ISP system 600 to increase brightness in color images acquired by the second camera. In another example, if the standard deviation of the pixel values for the second color image is greater than the standard deviation of the first color image, color consistency parameters that determine the strength of the noise filter at denoise 610 can be increased to reduce the variance in pixel values in color images acquired by the second camera. Following block 712 process 700 ends.

Figure 8:
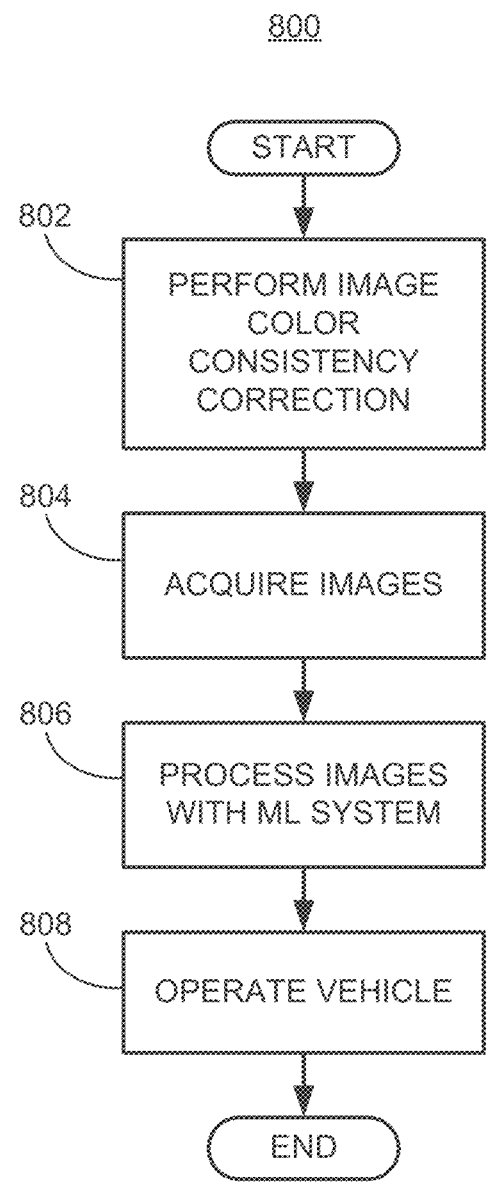
FIG. 8 is a flowchart diagram of an example process to operate a vehicle based on corrected camera data.

FIG. 8 is a flowchart of a process 800 for operating a vehicle 110 with a machine learning system using color images corrected for color consistency using ISP system 600 as described above in relation to FIG. 7. Process 800 can be implemented in a computing device 115 in a vehicle 110, for example. Process 800 includes multiple blocks that can be executed in the illustrated order. Process 800 could alternatively or additionally include fewer blocks, and can include the blocks executed in different orders.

Process 800 begins at block 802, where a computing device 115 in a vehicle 110 performs camera, spatial and temporal color consistency correction by determining color consistency parameters to be included in an ISP system 600.

At block 804 computing device 115 acquires color image data from one or more cameras included in a vehicle 110 and processes them with an ISP system that includes color consistency parameters determined at block 800 and as described in relation to FIG. 6.

At block 806 a machine learning system can receive a color image corrected for color consistency and process it to determine an object identity and an object location of an object in the environment around vehicle 110.

At block 808 computing device 115 can receive the identity and location of the object and determine a vehicle path that includes the object. For example, computing device 115 can determine a vehicle path that applies vehicle steering to direct vehicle 110 away from the object or slow vehicle 110. Computing device 115 can transmit commands to vehicle controllers 112, 113, 114 to control one or more of vehicle propulsion or vehicle steering to cause vehicle 110 to travel on the determined vehicle path. Following block 808 process 800 ends.

Any action taken by a vehicle or user of the vehicle in response to one or more navigation prompts disclosed herein should comply with all rules and regulations specific to the location and operation of the vehicle (e.g., Federal, state, country, city, etc.). More so, any navigation prompts disclosed herein are for illustrative purposes only. Certain navigation prompts may be modified and omitted depending on the context, situation, and applicable rules and regulations. Further, regardless of the navigation prompts, users should use good judgement and common sense when operating the vehicle. That is, all navigation prompts, whether standard or "enhanced," should be treated as suggestions and only followed when prudent to do so and when consistent with any rules and regulations specific to the location and operation of the vehicle.

Computing devices such as those described herein generally each includes commands executable by one or more computing devices such as those identified above, and for carrying out blocks or steps of processes described above. For example, process blocks described above may be embodied as computer-executable commands.

Computer-executable commands may be compiled or interpreted from computer programs created using a variety of programming languages and technologies, including, without limitation, and either alone or in combination, Java™, C, C++, Python, *Julia*, SCALA, Visual Basic, Java Script, Perl, HTML, etc. In general, a processor (i.e., a microprocessor) receives commands, i.e., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (i.e., tangible) medium that participates in providing data (i.e., instructions) that may be read by a computer (i.e., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, i.e., a candidate to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system, comprising:
a computer that includes a processor and a memory, the memory including instructions executable by the processor to:
determine a first prediction with a machine learning system based on receiving a first image from a first camera;
determine a second prediction with the machine learning system based on receiving a second image from a second camera;
when the first prediction does not equal the second prediction within a user determined tolerance:
determine color consistency based on comparing pixel values from the first image with a threshold determined based on previously determined pixel values;
determine color consistency parameters by determining pixel statistics based on pixel values from the first image and the second image to include in an image signal processing system; and
apply the color consistency parameters to the second image from the second camera with the image signal processing system.

2. The system of claim 1, the instructions including further instructions to determine the threshold by varying pixel values in a training dataset image input to a machine learning system to determine when a prediction output changes based on the pixel values.

3. The system of claim 1, wherein the pixel statistics include a pixel mean and a pixel standard deviation.

4. The system of claim 1, wherein the color consistency parameters include one or more of lens shading, white balance, defect pixel, denoise, color interpolation, edge enhancement, color correction matrix, brightness/contrast, and gamma.

5. The system of claim 1, wherein the color consistency is based on determining one or more of camera color consistency, spatial color consistency, and temporal color consistency on the images.

6. The system of claim 5, wherein camera color consistency is determined by comparing images acquired by different cameras viewing the same scene with the same illumination.

7. The system of claim 5, wherein spatial color consistency is determined by comparing overlapping images acquired by different cameras viewing portions of the same scene with differing illumination.

8. The system of claim 5, wherein temporal color consistency is determined by comparing images acquired by the camera viewing the same scene at different times.

9. The system of claim 1, wherein the first prediction and the second prediction include one or more of object identity and object location.

10. The system of claim 9, wherein the object identity includes one or more of a roadway and a vehicle.

11. The system of claim 1, wherein the machine learning system includes a convolutional neural network that includes convolutional layers and fully connected layers.

12. The system of claim 1, the instructions including further instructions to convert a red, green, blue (RGB) color space image to a luma, red projection, blue projection (YUV) image and outputting the image.

13. The system of claim 1, wherein the machine learning system is included in a mobile machine.

14. The system of claim 13, wherein the mobile machine is operated based on the one or more predictions.

15. The system of claim 14, wherein the mobile machine is a vehicle and the vehicle is operated by controlling one or more of vehicle propulsion and vehicle steering.

16. A method, comprising:
determining a first prediction with a machine learning system based on receiving a first image from a first camera;
determining a second prediction with the machine learning system based on receiving a second image from a second camera;
when the first prediction does not equal the second prediction within a user determined tolerance:
determining color consistency based on comparing pixel values from the first image with a threshold determined based on previously determined pixel values;
determining color consistency parameters by determining pixel statistics based on pixel values from the first image to include in an image signal processing system; and
applying the color consistency parameters to a third image from the first camera by receiving the third image at the image signal processing system.

17. The method of claim 16, further comprising determining the threshold by varying pixel values in a training dataset image input to a machine learning system to determine when a prediction output changes based on the pixel values.

18. The method of claim 16, wherein the pixel statistics include a pixel mean and a pixel standard deviation.

19. The method of claim 16, wherein the color consistency parameters include one or more of lens shading, white balance, defect pixel, denoise, color interpolation, edge enhancement, color correction matrix, brightness/contrast, and gamma.

20. The method of claim 16, wherein the color consistency is based on determining one or more of camera color consistency, spatial color consistency, and temporal color consistency on the images.

* * * * *